United States Patent
Li et al.

(10) Patent No.: US 10,402,307 B2
(45) Date of Patent: Sep. 3, 2019

(54) SYSTEM AND METHOD FOR PROVIDING RUNTIME TRACING FOR A WEB-BASED CLIENT ACCESSING A TRANSACTIONAL MIDDLEWARE PLATFORM USING AN EXTENSION INTERFACE

(71) Applicant: Oracle International Corporation, Redwood Shores, CA (US)

(72) Inventors: Wei Li, Beijing (CN); Boshu Guo, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 44 days.

(21) Appl. No.: 15/193,934

(22) Filed: Jun. 27, 2016

(65) Prior Publication Data

US 2017/0286261 A1    Oct. 5, 2017

Related U.S. Application Data

(63) Continuation of application No. PCT/CN2016/077990, filed on Mar. 31, 2016.

(51) Int. Cl.
*G06F 11/36* (2006.01)
*G06F 8/30* (2018.01)
(Continued)

(52) U.S. Cl.
CPC .......... *G06F 11/3636* (2013.01); *G06F 8/315* (2013.01); *G06F 9/44505* (2013.01); *G06F 9/44526* (2013.01); *H04L 67/02* (2013.01)

(58) Field of Classification Search
None
See application file for complete search history.

(56) References Cited

U.S. PATENT DOCUMENTS 7,627,853 B2 * 12/2009 Ibert ....................... G06F 9/542
                                                      717/104
7,664,948 B2    2/2010 Moreau
(Continued)

FOREIGN PATENT DOCUMENTS

CN    101408955    4/2009
CN    101699487    4/2010
(Continued)

OTHER PUBLICATIONS

Wagner et al. "MPI-focused tracing with OTFX: an MPI-aware in-memory event tracing extension to the open trace format 2." Proceedings of the 22nd European MPI Users' Group Meeting. ACM, 2015. Retrieved on [Apr. 11, 2019] Retrieved from the Internet: URL<https://dl.acm.org/citation.cfm?id=2802664> (Year: 2015).*

(Continued)

*Primary Examiner* — Thuy Dao
*Assistant Examiner* — Cheneca Smith
(74) *Attorney, Agent, or Firm* — Tucker Ellis LLP (57) ABSTRACT

In accordance with an embodiment, described herein is a system and method for providing runtime tracing for a web-based client that accesses a transactional middleware platform using an extension interface. The extension interface provides an extension server and a class library to make application services in the transactional middleware platform available to web-based clients. A trace generator can be provided to compose a trace filter specifying categories of trace points, and to generate trace records based on the composed trace filter and trace points encountered at runtime. Code snippets can be inserted into each class in the class library for use in invoking the trace generator. At runtime, one or more objects instantiated from the class library can invoke the trace generator to generate trace (Continued)

records that track a particular web-based client end to end, from the time it starts a service call to the time it gets a response.

20 Claims, 7 Drawing Sheets

(51) Int. Cl.
*G06F 9/445* (2018.01)
*H04L 29/08* (2006.01)

(56) References Cited

U.S. PATENT DOCUMENTS

| | | | | |
|---|---|---|---|---|
| 7,886,281 B2* | 2/2011 | Smith | ............... | G06F 9/466 |
| | | | | 714/37 |
| 8,010,783 B1 | 8/2011 | Cahill | | |
| 8,423,973 B2* | 4/2013 | Saunders | ............... | G06Q 30/06 |
| | | | | 717/130 |
| 8,683,489 B2* | 3/2014 | Dixon | ............... | G06F 9/546 |
| | | | | 719/314 |
| 9,098,612 B2* | 8/2015 | Malkiman | ............ | G06F 11/3419 |
| 9,251,026 B2* | 2/2016 | Hulick | ............... | G06F 11/3495 |
| 9,882,913 B1 | 1/2018 | Borowiec et al. | | |
| 2002/0073063 A1* | 6/2002 | Faraj | ............... | G06F 11/3636 |
| 2003/0195997 A1* | 10/2003 | Ibert | ............... | G06F 9/542 |
| | | | | 719/318 |
| 2005/0044197 A1 | 2/2005 | Lai | | |
| 2005/0223048 A1* | 10/2005 | Smith | ............... | G06F 9/466 |
| 2006/0021019 A1 | 1/2006 | Hinton et al. | | |
| 2007/0006177 A1* | 1/2007 | Aiber | ............... | G06Q 10/10 |
| | | | | 717/136 |
| 2007/0112549 A1 | 5/2007 | Lau | | |
| 2007/0220598 A1 | 9/2007 | Salowey et al. | | |
| 2009/0106433 A1 | 4/2009 | Knouse et al. | | |
| 2009/0183143 A1* | 7/2009 | Li | ............... | G06F 11/3414 |
| | | | | 717/126 |
| 2010/0287541 A1* | 11/2010 | Saunders | ............... | G06Q 30/06 |
| | | | | 717/139 |
| 2012/0158821 A1 | 6/2012 | Barros | | |
| 2013/0191884 A1 | 7/2013 | Leicher et al. | | |
| 2013/0263096 A1* | 10/2013 | Hulick | ............... | G06F 11/3495 |
| | | | | 717/130 |
| 2014/0052548 A1 | 2/2014 | Dokken, Jr. | | |
| 2014/0149803 A1* | 5/2014 | Lehofer | ............... | G06F 11/3495 |
| | | | | 714/47.1 |
| 2014/0189839 A1 | 7/2014 | Jezek | | |
| 2014/0282882 A1 | 9/2014 | Tsui et al. | | |
| 2014/0282918 A1 | 9/2014 | Rothschild et al. | | |
| 2017/0187714 A1 | 6/2017 | Guo et al. | | |

FOREIGN PATENT DOCUMENTS

| | | |
|---|---|---|
| CN | 103647794 | 3/2014 |
| CN | 103745321 | 4/2014 |

OTHER PUBLICATIONS

Waddington et al. "Dynamic analysis and profiling of multithreaded systems." Advanced Operating Systems and Kernel Applications : Techniques and Technologies. IGI Global, 2010.Retrieved on [Apr. 11, 2019] Retrieved from the Internet: URL<ftp://193.219.28.2/packages/ace/ACE/PDF/DSIS_Chapter_Waddington.pdf> (Year: 2010).*
State Intellectual Property Office of the P.R. China (ISA/CN), International Search Report dated Jan. 6, 2017 for International Application No. PCT/CN2016/077990, 13 Pages.
State Intellectual Property Office of the P.R. China, International Searching Authority, International Search Report and Written Opinion dated Dec. 29, 2016 for International Application No. PCT/CN2016/077972, 13 Pages.
Christian Pape et al., "RESTful Correlation and Consolidation of Distributed Logging Data in Cloud Environments", ICIW 2013: The Eighth International Conference on Internet and Web Applications and Services, Copyright © IARIA 2013, ISBN: 978-1-61208-280-6, 6 pages.
Raffael Marty, "Cloud Application Logging for Forensics", SAC' 11 Mar. 21-25, 2011, TaiChung, Taiwan, Copyright 2011, ACM, 7 pages.
Damela Clark, "4.2 x Documentation / Configuring Application Analytics Business Transaction and Log Correlation" last modified by Jacquie Finney on Jan 10, 2016, 7 pages, retrieved on Nov. 14, 2016 from: <https://docs.appdynamics.com/display/PRO42/Business+Transaction+and+Log+Correlation>.
United States Patent and Trademark Office, Office Action dated May 9, 2018 for U.S. Appl. No. 15/193,949, 18 Pages.

* cited by examiner

Figure 7

SYSTEM AND METHOD FOR PROVIDING RUNTIME TRACING FOR A WEB-BASED CLIENT ACCESSING A TRANSACTIONAL MIDDLEWARE PLATFORM USING AN EXTENSION INTERFACE

CLAIM OF PRIORITY

This application is a continuation of and claims the benefit of priority to International Application titled "SYSTEM AND METHOD FOR PROVIDING RUNTIME TRACING FOR A WEB-BASED CLIENT ACCESSING A TRANSACTIONAL MIDDLEWARE PLATFORM USING AN EXTENSION INTERFACE", International Application No. PCT/CN2016/077990, filed Mar. 31, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to middleware platforms, and are particularly related to a system and method for providing runtime tracing for a web-based client accessing a transactional middleware platform using an extension interface.

BACKGROUND

Runtime tracing is often used by application developers and administrators to monitor or debug a software application. However, when a software application involves multiple tiers, and a plurality of different systems, tracing the execution of the software application can be difficult.

SUMMARY

In accordance with an embodiment, described herein is a system and method for providing runtime tracing for a web-based client that accesses a transactional middleware platform using an extension interface. The extension interface provides an extension server and a class library to make application services in the transactional middleware platform available to web-based clients. A trace generator can be provided to compose a trace filter specifying categories of trace points, and to generate trace records based on the composed trace filter and trace points encountered at runtime. Code snippets can be inserted into each class in the class library for use in invoking the trace generator. At runtime, one or more objects instantiated from the class library can invoke the trace generator to generate trace records that track a particular web-based client end to end, from the time it starts a service call to the time it gets a response.

DETAILED DESCRIPTION

A transactional middleware platform, for example Oracle's Tuxedo system, can host a large number of legacy applications. These applications can include application services (for example, Tuxedo services) that can be made accessible to web-based clients using an extension interface (for example, Oracle's Java OnLine Transactions or JOLT).

A service call from a web-based client needs to pass through a plurality of layers to access a particular application service in a transactional middleware platform. As such, tracing the web-based client can be valuable to application developers and administrators for debugging and monitoring purposes In accordance with an embodiment, described herein is a system and method for providing runtime tracing for a web-based client that accesses a transactional middleware platform using an extension interface. The extension interface provides an extension server and a class library to make application services in the transactional middleware platform available to web-based clients. A trace generator can be provided to define a trace filter specifying categories of trace points, and to generate trace records based on the composed trace filter and trace points encountered at runtime. Code snippets can be inserted into each class in the class library for use in invoking the trace generator. At runtime, one or more objects instantiated from the class library can invoke the trace generator to generate trace records that track a particular web-based client end to end, from the time it starts a service call to the time it gets a response.

Middleware Platforms

Middleware platforms can provide a set of software modules that enable the construction, execution, and administration of high performance, distributed applications. A middleware platform can be a transaction-oriented system, for example, Oracle's Tuxedo system; or a service-oriented architecture (SOA) oriented system, for example, Oracle Fusion Middleware.

In accordance with an embodiment, applications targeted to a SOA-oriented middleware platform are typically standards-based web services, for example, Simple Object Access Protocol (SOAP) services or representational state transfer (REST) services. Each web service can be associated with a web service description language (WSDL) file, or a web application description language (WADL), that describes methods provided by the web service, and parameters required for accessing the web service.

Web services can be accessed by various web-based clients, including an application executing inside a web browser (for example, a Java Applet), a standalone Java application, another web service, or any program that accesses the web-bases services over a network connection using web protocols such as HTTP. A web service can communicate with another web-based client through XML messages.

In accordance with an embodiment, an application deployed to a transaction-oriented middleware platform or transactional middleware platform can comprise one or more client programs and one or more server programs. A client program of such an application can be developed, compiled and deployed as part of the application. For example, a client program can be compiled and linked with runtime libraries of the transactional middleware platform, for use in collecting input from a user, and sending requests to a server. A server program represents one or more application services that encapsulate business logic to process the input from a client.

In accordance with an embodiment, to be a client, a program needs to be able to invoke functions and procedures in a communication library (for example, Tuxedo's Application-to-Transaction-Monitor Interface, or ATMI) of the transactional middleware platform. A client can join an application by calling a client initialization routine in the communication library. Once a client joins an application, the client can define transaction boundaries and invoke functions in the communication library to communicate with application services in the application.

In accordance with an embodiment, before a client can send data to a server, the client needs to allocate a memory area/typed buffer (for example, a C structure or a COBOL record) from the runtime of a transactional middleware platform.

In accordance with an embodiment, a transactional middleware platform can include a shared memory (for example, Tuxedo's Bulletin Board) with information about clients and servers. A client can be a native client or a workstation client. A native client runs on a same machine wherein the shared memory exists, to directly access the shared memory to communicate with a server. A workstation client cannot access the shared memory, and needs to use TCP/IP sockets (for example, by executing a tpinit( ) call) to send messages to one or more server processes, which access the shared memory on behalf of the workstation client.

Application services in a transactional middleware platform can be exposed as web services to be accessible to web-based clients, using added-on products or extension interfaces to the transactional middleware platform.

For example, Oracle Service Architecture Leveraging Tuxedo (SALT) represents an added-on product that enables application services in a transactional middleware platform to participate in SOA environments. Java OnLine Transactions (JOLT) represents a Java-based interface that extends the functionality of existing application services to include Intranet- and Internet-wide availability.

In accordance with an embodiment, application services in a transactional middleware platform can also be made web accessible to web-based clients through a gateway (for example, WebLogic Tuxedo connector, or VVTC) that bridges the two platforms.

Regardless which approach is used, events and activities associated with a particular service request across the different platforms can be correlated using an execution context identifier (ECID), which can be propagated with each request within a transactional middleware platform, and across different middleware platforms.

Extension Interface

Figure 1:
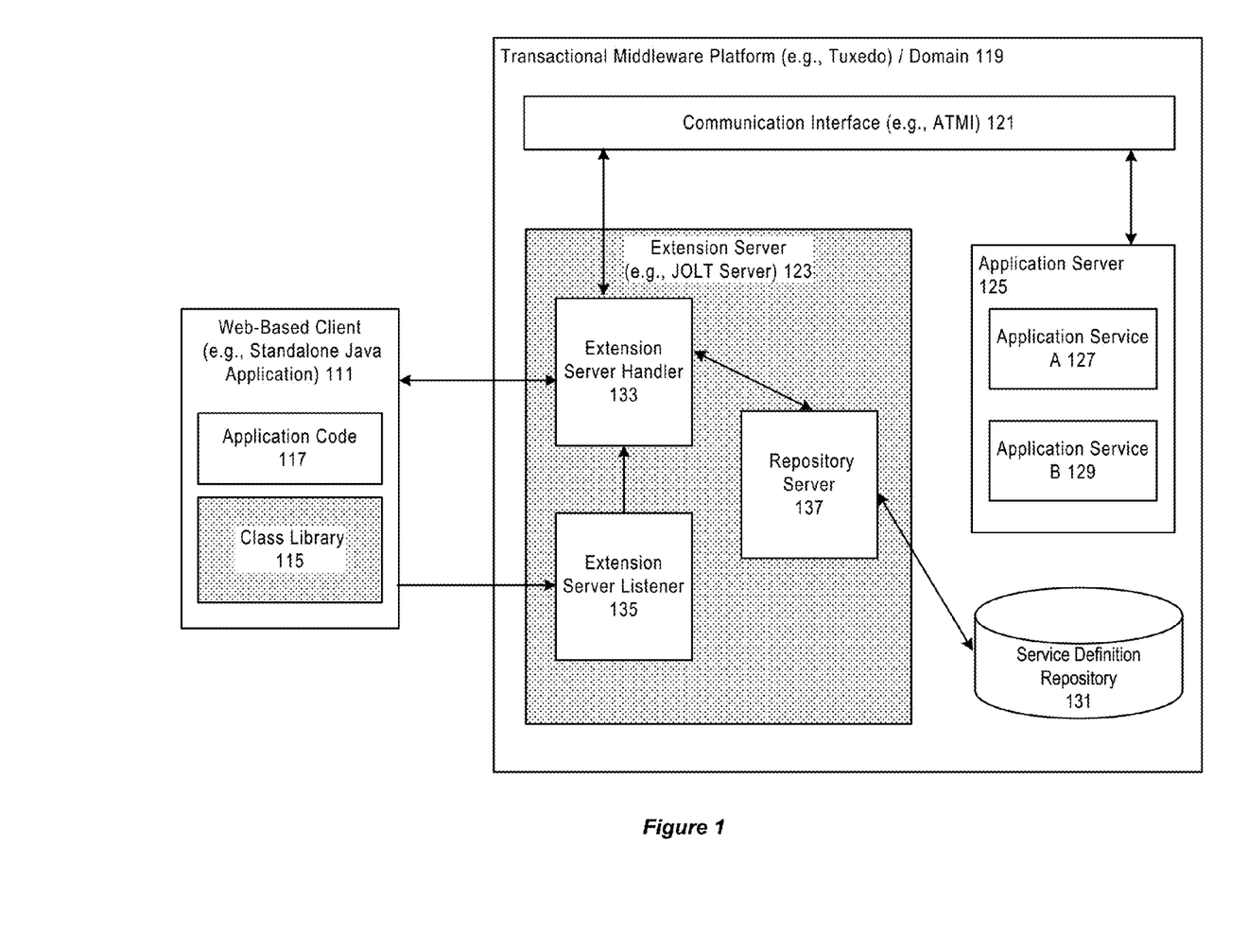
FIG. 1 illustrates an extension interface that enables a web-based client to access a transactional middleware platform, in accordance with an embodiment.

FIG. 1 illustrates an extension interface that enables web-based clients to access a transactional middleware platform, in accordance with an embodiment.

As shown in FIG. 1, a transactional middleware platform domain 119 can include a plurality of application services (for example, application A 127 and application service B 129) on an application server 125.

Typically, requests to the application services can be implemented in C or COBOL as a sequence of calls to a library in a communication interface 121 from a workstation client. However, this approach requires that the library for a specific combination of CPU and operating system release be installed on the client machine.

In accordance with an embodiment, an extension interface can be provided to enable a web-based client (an applet in a Java-enabled web browser, or a standalone Java application) 111 to access the application services. The extension interface can include a class library 115 for use by the web-based client, and an extension server 123.

In accordance with an embodiment, an extension server listener 135 in the extension server can receive a connection from the web-based client, and assign the connection to an extension server handler 133. The extension server handler can manage communications between the web-based client and the application server, including managing network connectivity, executing service requests on behalf of the web-based client, and translating buffer data between different formats. A service definition repository 131 can contain definitions of the application services. At runtime, a repository server 137 can retrieve the service definitions from the service definition repository, and pass the service definitions to the extension server handler for use in accessing the application services.

In accordance with an embodiment, the class library can include a set of classes that can be used by the web-based client to make service requests to the application server. The set of classes can be used to set, retrieve, manage, and invoke communication attributes, notifications, network connections, transactions, and services.

In accordance with an embodiment, at runtime, application code 117 in the web-based client can open a connection to the extension server, retrieve the signature of an application service (for example, name, parameters, types), build a service request object, and make a service request to the application service. The service request can be sent to the extension server, which can translate the web-based request into a format required by the transactional middleware platform, and forward the request to the application server. The transactional middleware platform can process the request and return a response to the extension server.

In accordance with an embodiment, after entering the transactional middleware platform, the service request can be forwarded to the application server through the communication interface. Similarly, the response can be returned through the communication interface to the extension server.

Figure 2:
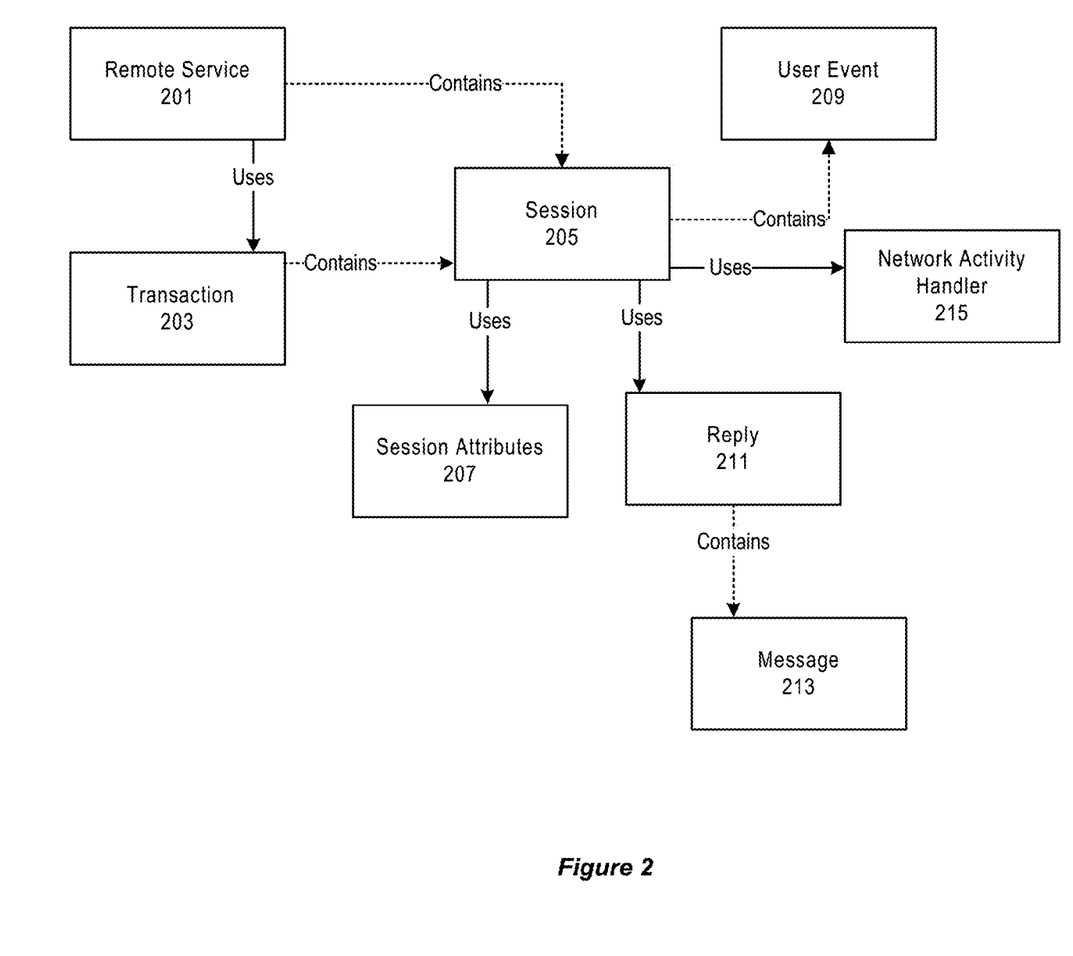
FIG. 2 is a diagram illustrating relationships instantiated objects of classes in a class library, in accordance with an embodiment.

FIG. 2 is a diagram illustrating relationships between instantiated objects of classes in a class library, in accordance with an embodiment.

As shown in FIG. 2, a class library can include a remote service object 201, a transaction object 203, a session object 205, a user event object 209, a session attributes object 270, a reply object 211, a message object 213, and a network activity handler object 215. These objects can interact with each other in a plurality of relationships, including a "is a" relationship, a "uses-a" relationship, and a "contains a" relationship.

In accordance with an embodiment, the set of objects can be used to perform a plurality of operations between a web-based client and an extension server, include binding the web-based client to a transactional middleware platform, establishing a session, setting variables, performing transaction processing, and logging the web-based client off the transactional middleware platform.

For example, a session object and session attributes object can be used to establish a connection between a web-based client and a transactional middleware platform. A remote service object, which represents an exported request/reply application service in a transactional middleware platform, can be used to handle transaction activities such as requests and replies. To instantiate a remote service object, an application service name and a session object can be provided as parameters.

Runtime Tracing

In accordance with an embodiment, the system can provide runtime tracing for a web-based client that accesses a transactional middleware platform using an extension interface. The extension interface provides an extension server and a class library to make application services in the transactional middleware platform available to web-based clients. A trace generator can be provided to define a trace filter specifying categories of trace points, and to generate trace records based on the composed trace filter and trace points encountered at runtime. Code snippets can be inserted into each class in the class library for use in invoking the trace generator. At runtime, one or more objects instantiated from the class library can invoke the trace generator to generate trace records that track a particular web-based client end to end, from the time it starts a service call to the time it gets a response.

In accordance with an embodiment, the end-to-end tracing for the web-based client can generate trace records with a common identifier, for use in debugging issues associated with a particular service call that has passed through various layers of the extension interface. The end-to-end tracking feature can be turned on or off during the execution of the web-client, by changing the trace specification using a command.

In accordance with an embodiment, the trace points can be classified into trace categories. Each trace point belongs to a single category. The trace filter can describe the trace categories of interest, and minimal processing occurs for trace points that do not pass the trace filter.

In accordance with an embodiment, the trace specification can be a string with a particular syntax for specifying a filter, a receiver, and a trigger. The filter can describe categories of trace points to be examined or ignored. The receiver can represent an entity to which a trace log is sent, for example, a user log file. The trigger can be an action to be performed after a trace record is emitted. For example, the trigger can specify an action "ulog", indicating that the trace record should be written to a user log.

In accordance with an embodiment, the trace points can be categorized into ATMI trace points, network trace points, and trace points related to the tracing feature itself. The ATMI trace points can be used to trace explicit application calls to the extension interface (for example, different layers of JOLT), the network tracing points can trace low-level network activities on a network.

Figure 3:
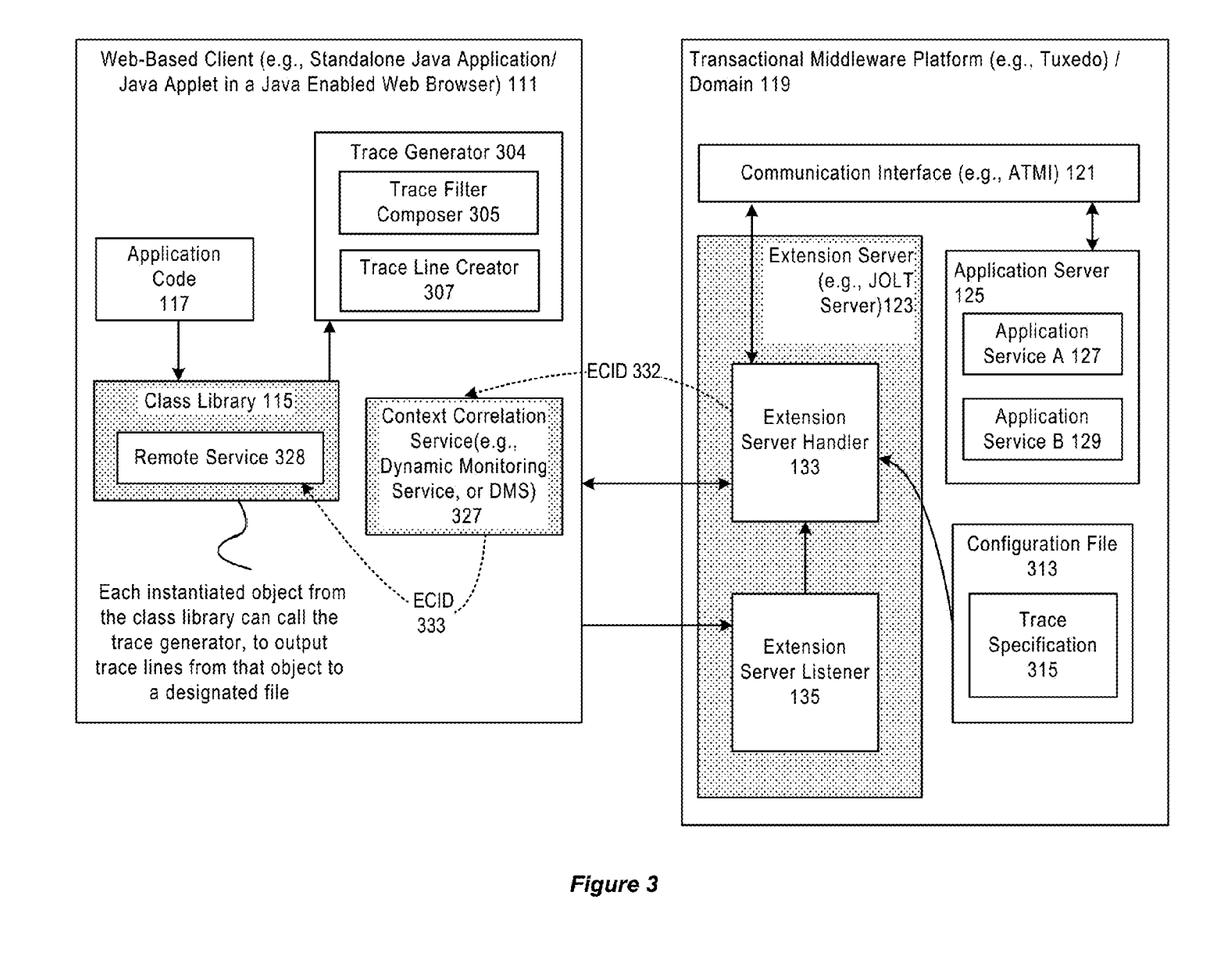
FIG. 3 illustrates a system for providing runtime tracing for a web-based client accessing a transactional middleware platform using an extension interface, in accordance with an embodiment.

FIG. 3 illustrates a system for providing runtime tracing for a web-based client accessing a transactional middleware platform using an extension interface, in accordance with an embodiment.

As shown in FIG. 3, in accordance with an embodiment, the transactional middleware platform can include a configuration file 313 with a trace specification property 315. The configuration file can be retrieved by the extension server handler for use in creating an execution context for a transaction initiated by the web-based client. The execution context can represent a reference to an association between the web-based client and the transactional middleware platform domain, and can include one or more domain configuration environment variables. Each service call originated by the web-based client can operate within the execution context.

In accordance with an embodiment, the extension server handler can create an execution context identifier (ECID) and associate it with the execution context. The ECID can be a unique identifier to correlate events or requests associated with the particular transaction across a plurality of layers (for example, different objects in the class library) in the system, and allow an administrator to track the end-to-end flow of a particular request across the plurality of layers.

In accordance with an embodiment, the ECID can be received 332 by a context correlation service (for example, Oracle's dynamic monitoring service, or DMS) 327, which can push the ECID through a range of different components and layers in the system.

In accordance with an embodiment, a remote service 328 can retrieve 333 the ECID and associate it with trace records.

As further shown in FIG. 3, a trace generator 304 can define a trace filter composer 305 and a trace record creator 307. The trace filter composer can parse the trace specification defined by the trace specification property, and create a trace filter specifying one or more categories of trace points to trace.

In accordance with an embodiment, the trace record creator can determine the category of a trace point when the trace point occurs, and compare the category with the trace filter. If the category is found in the trace filter, the trace point can be processed according to the receiver and trigger in the trace specification. If the category is not found, no further processing of the trace point occurs.

In accordance with an embodiment, the trace record creator can compose a trace record including a current time, a host name, a process identifier, a thread identifier, an ECID, a trace category name of a particular trace point, and additional information for the trace point.

Figure 4:
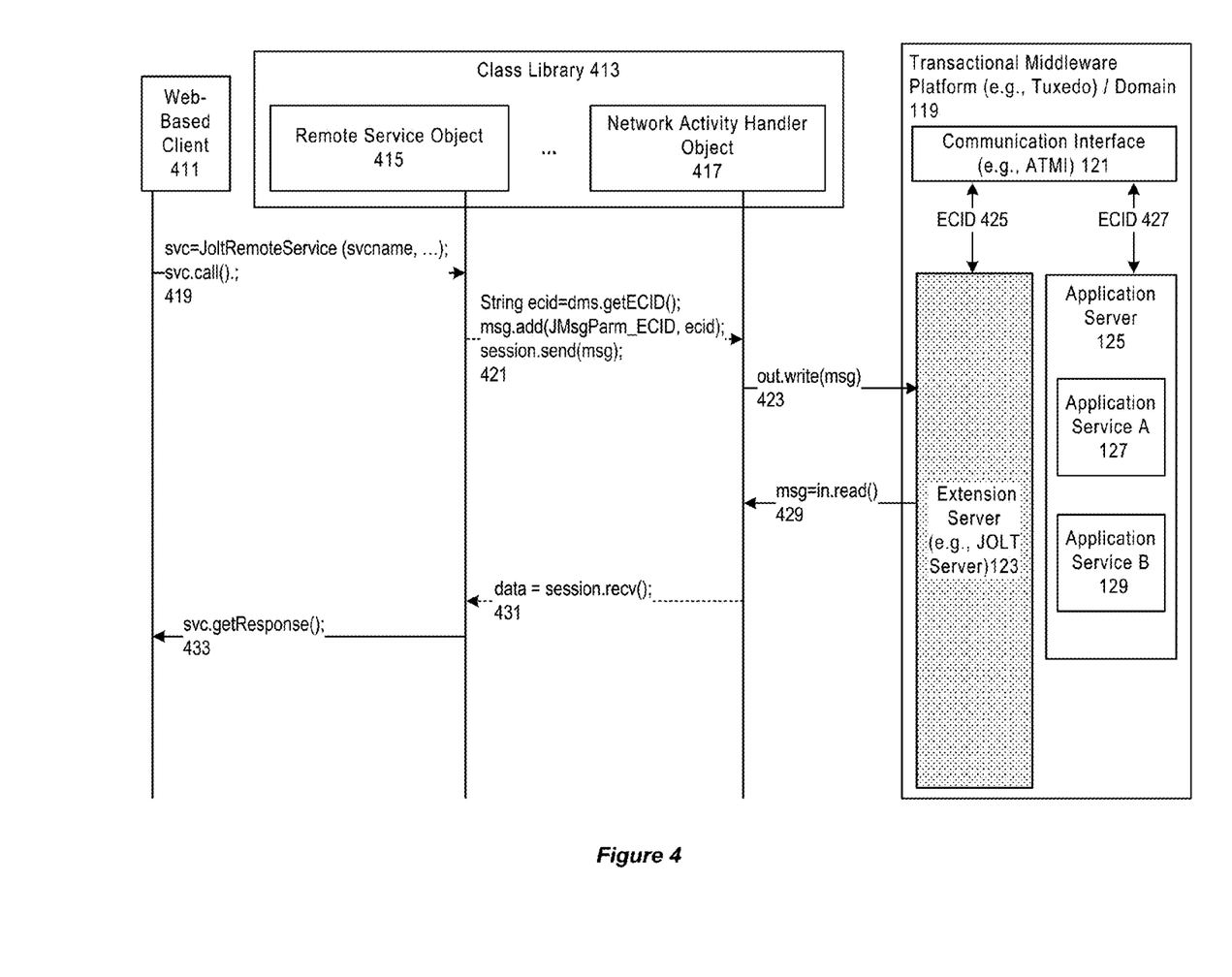
FIG. 4 illustrates a sequence diagram of runtime tracing for a web-based client accessing a transactional middleware platform using an extension interface, in accordance with an embodiment.

FIG. 4 illustrates a sequence diagram of runtime tracing for a web-based client accessing a transactional middleware platform using an extension interface, in accordance with an embodiment.

As shown in FIG. 4, a service call from a web-based client 411 can pass through a plurality of layers, including a plurality of objects (for example, remote service object 415, and a network activity handler object 417) instantiated from a class library 413, the extension server, and the communication interface, before reaching an application service in the transactional middleware platform.

In accordance with an embodiment, the service call can be initiated 419 at the web-based client by the remote service object. The remote service object can determine if the configuration file has specified a property to enable an ECID. If such a property is specified, the remote service object can retrieve 421 an ECID from a context correlation service (for example, dynamic monitoring service, or DMS), and add the ECID to a header of a message sent by the web-based client.

As further shown in FIG. 4, the network activity handler object can write 423 the message including the ECID to the extension server. The extension server can create a request in a format required by the transactional middleware platform, to communicate with the communication interface.

As shown in FIG. 4, the ECID retrieved from the context correlation service can be passed 425 between the extension server and the communication interface, and 427 between the communication interface and the application server.

In accordance with an embodiment, when a response message is received by the extension server, the network activity handler object can read 429 the response message, and transmit 431 the response message to the remote service object, which forwards 433 the response message to the web-based client.

In accordance with an embodiment, as the service call passes through the plurality of layers, various trace points can be encountered, and the trace generator can be called by each object associated with a particular trace point, to generate trace records, based on the trace specification defined in the configuration file.

Exemplary Implementation

In accordance with an embodiment, the features described above can be implemented using the following code snippets.

Listing 1 shows an exemplary implementation of a trace generator in accordance with an embodiment.

Listing 1

```
public class JoltTrace( ) {
  int filter;
  public JoltTrace ( ) {
    // read trace specification from system property
    // tuxedo.TMTRACE"
    spec = System.getProperty("tuxedo.TMTRACE");
    parse(spec);
  }
  public parse (String spec) {
    // parse the trace specification, fill in the filter
    // filter can be the compose of all trace categories
    //(filter=atmi|inet|trace)
    ...
  }
  public doTrace(format, trace_line) {
    // determine the trace category: atmi or inet or trace
    trace_head = format & filter;
    ...
    // compose the trace record with:
    // "current_time.hostname.procedd_id.thread_id: trace_head:
    //trace_line"
    log_file.write(final_trace_line);
  }
}
```

Listing 2 shows a class defined to invoke the trace generator to generate trace records associated with ATMI trace points, in accordance with an embodiment.

Listing 2

```
public class JoltSession {
  itrace = new JoltTrace( );
  public logon(userName, userRole, ...) {
    // log the begin of ATMI call logon
    itrace.doTrace(itrace.tr_atmi,"{ JoltSession.logon(userName " +
userName + ", userRole " + userRole +...)");
    // do logon
    ...
    // log the end of ATMI call logon
    itrace.doTrace(itrace.tr_atmi,"} JoltSession.logon");
  }
  ...
}
```

Listing 3 shows another class defined to invoke the trace generator to generate trace records associated with network trace points, in accordance with an embodiment.

Listing 3

```
public class NeHdlr {
  itrace = new JoltTrace( );
  ...
  private void send(int msg_id, byte[ ] msg, int len, long sto, int msg_code) {
    itrace.doTrace(itrace.tr_inet,"{ NwHdlr.send(msg_id " + msg_id +
", len " + len + ", sto " + sto + ", msg_code " + msg_code + ")");
    ...
    itrace.doTrace(itrace.tr_inet,"["+h_session_id+"]        Appending
placeholder receive buffer - msg_id="+msg_id);
    ...
    itrace.doTrace(itrace.tr_inet,"} NwHdlr.send");
  }
}
```

Listing 4 illustrates a sample output showing trace records associated with various types of trace points, in accordance with an embodiment.

```
105127.bej301151.5053.18: atmi:    { JoltRemoteService.call(principal
null, realm null)
105127.bej301151.5053.18: atmi:       {
JoltRemoteService.encodeCALL(principal null, realm null)
105127.bej301151.5053.18: ECID <0000Ky6oFMW7IBSLME4Eye1LtHAh000001>:
atmi:    } JoltRemoteService.encodeCALL
105127.bej301151.5053.18: ECID <0000Ky6oFMW7IBSLME4Eye1LtHAh000001>:
atmi:    { JoltSession.send(len 193)
105127.bej301151.5053.18: ECID <0000Ky6oFMW7IBSLME4Eye1LtHAh000001>:
atmi:    } JoltSession.send
105127.bej301151.5053.18: ECID <0000Ky6oFMW7IBSLME4Eye1LtHAh000001>:
inet:    { NwHdlr.send(msg_id 4, len 193, sto 0, msg_code 140)
105127.bej301151.5053.18: ECID <0000Ky6oFMW7IBSLME4Eye1LtHAh000001>:
inet:    [1] Appending placeholder receive buffer - msg_id=4
105127.bej301151.5053.18: ECID <0000Ky6oFMW7IBSLME4Eye1LtHAh000001>:
inet:    [1] Message put in OutQ
```

```
105127.bej301151.5053.18: ECID <0000Ky6oFMW7IBSLME4Eye1LtHAh000001>:
inet:   [1] Waiting on IOBuf
105127.bej301151.5053.18: ECID <0000Ky6oFMW7IBSLME4Eye1LtHAh000001>:
inet:   [1] Msg sent OK, msg_id=4
105127.bej301151.5053.18: ECID <0000Ky6oFMW7IBSLME4Eye1LtHAh000001>:
inet:   } NwHdlr.send
105127.bej301151.5053.18: ECID <0000Ky6oFMW7IBSLME4Eye1LtHAh000001>:
atmi:   { JoltSession.recv(msgid 4)
105127.bej301151.5053.18: ECID <0000Ky6oFMW7IBSLME4Eye1LtHAh000001>:
atmi:   } JoltSession.recv
105127.bej301151.5053.18: ECID <0000Ky6oFMW7IBSLME4Eye1LtHAh000001>:
inet:   { NwHdlr.recv(msg_id 4, rto 0)
105127.bej301151.5053.18: ECID <0000Ky6oFMW7IBSLME4Eye1LtHAh000001>:
inet:   [1] NwHdlr.recv( ): IOBuf in InQ, msgid=4, Status=(8:SENT)
105127.bej301151.5053.18: ECID <0000Ky6oFMW7IBSLME4Eye1LtHAh000001>:
inet:   [1] NwHdlr.recv( ): got Inbound
IOBuf,msgid=4,status=(32:RECEIVED)
105127.bej301151.5053.18: ECID <0000Ky6oFMW7IBSLME4Eye1LtHAh000001>:
inet:   } NwHdlr.recv
105127.bej301151.5053.18: ECID <0000Ky6oFMW7IBSLME4Eye1LtHAh000001>:
atmi:   { JoltRemoteService.decodeCALL(intran false)
105127.bej301151.5053.18: ECID <0000Ky6oFMW7IBSLME4Eye1LtHAh000001>:
atmi:   } JoltRemoteService.decodeCALL
105127.bej301151.5053.18: ECID <0000Ky6oFMW7IBSLME4Eye1LtHAh000001>:
atmi:} JoltRemoteService.call
```

Figure 5:
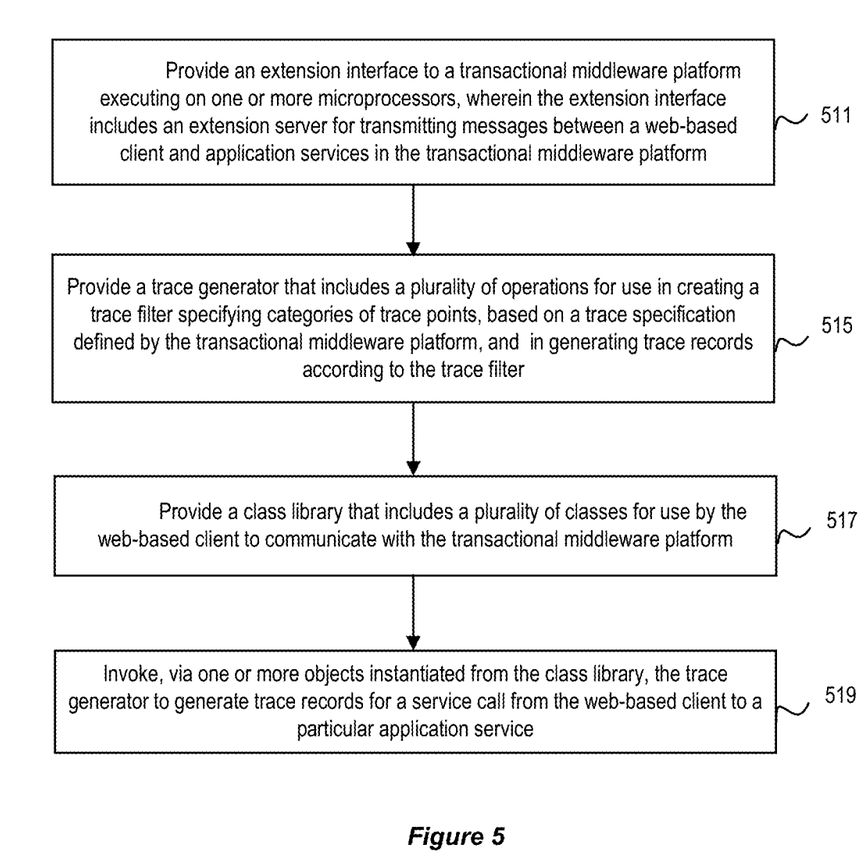
FIG. 5 illustrates a method for providing runtime tracing for a web-based client accessing a transactional middleware using an extension interface, in accordance with an embodiment.

FIG. 5 illustrates a method for providing runtime tracing for a web-based client accessing a transactional middleware using an extension interface, in accordance with an embodiment.

As shown in FIG. 5, at step 511, an extension interface to a transactional middleware platform can be provided, wherein the extension interface includes an extension server for transmitting messages between a web-based client and application services in the transactional middleware platform.

At step 515, a trace generator can be provided, wherein the trace generator includes a plurality of operations for use in creating a trace filter specifying categories of trace points, based on a trace specification defined by the transactional middleware platform, and in generating trace records according to the trace filter.

At step 517, a class library including a plurality of classes can be provided for use by the web-based client to communicate with the transactional middleware platform.

At step 519, the trace generator can be invoked by one or more objects instantiated from the class library, to generate trace records for a service call from the web-based client to a particular application service.

Figure 6:
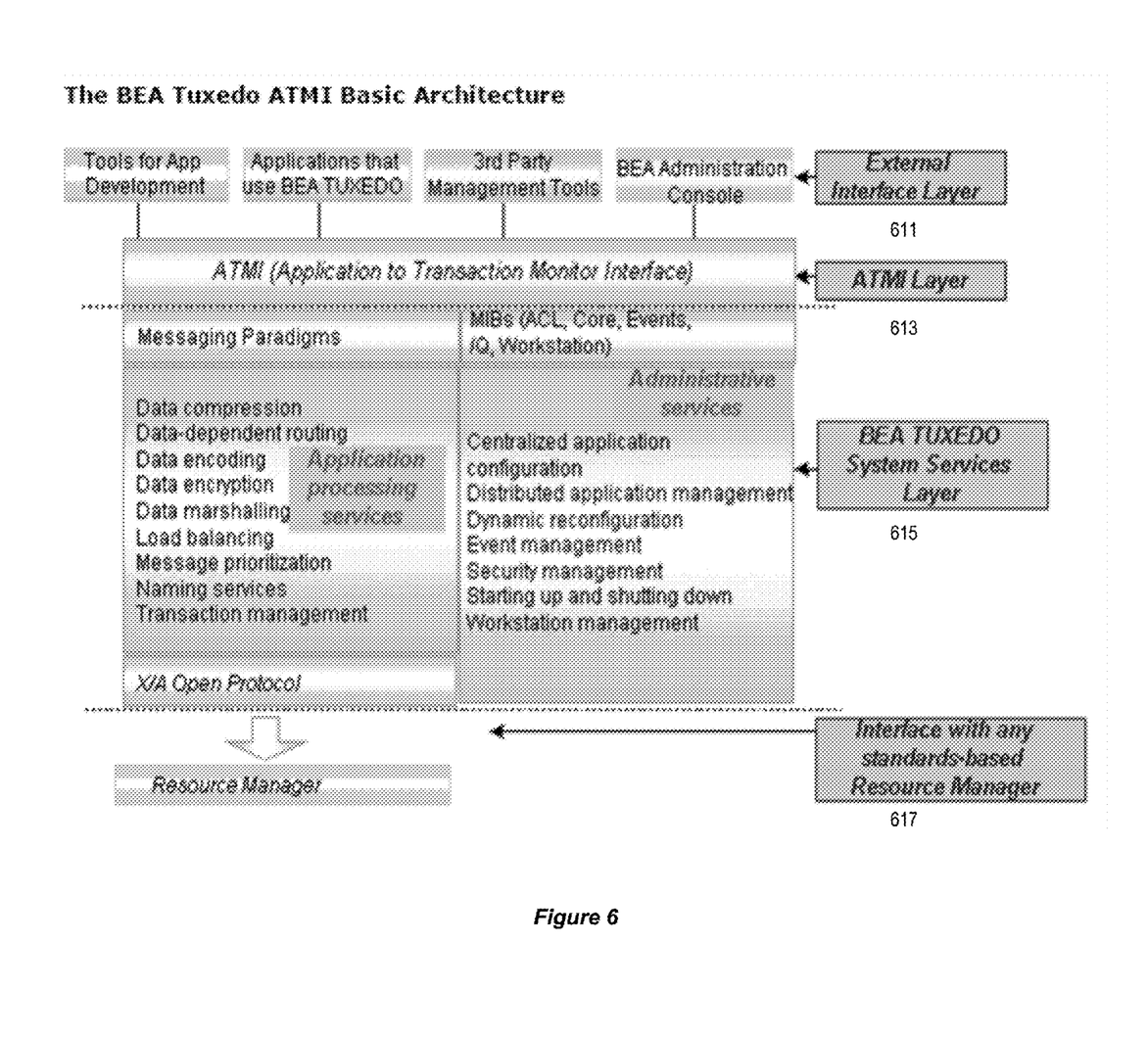
FIGS. 6-7 illustrate an exemplary transactional middleware platform, in accordance with an embodiment.
Figure 7:
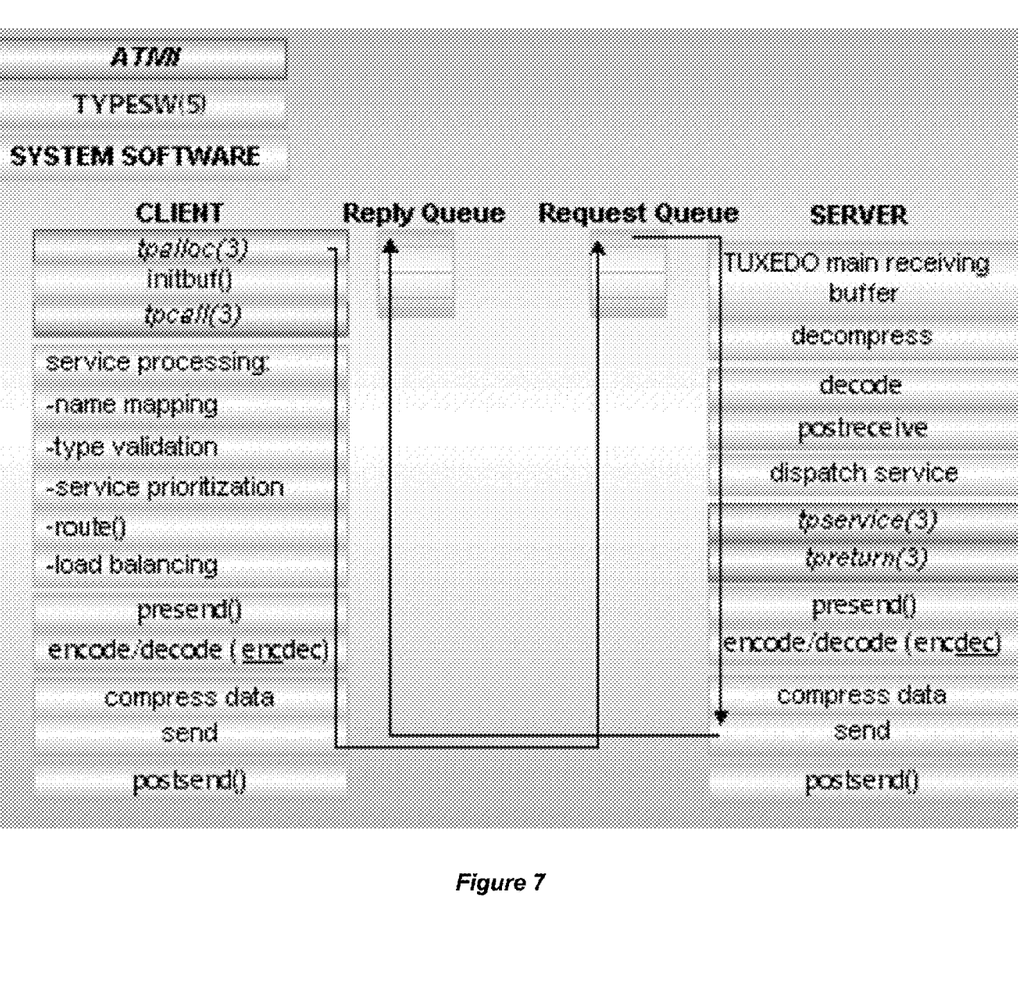

FIGS. 6-7 illustrate an exemplary transactional middleware platform, in accordance with an embodiment.

In accordance with an embodiment, Tuxedo (Transactions for UNIX, Enhanced for Distributed Operation) can be a transactional middleware platform described in various embodiments of the present invention.

Tuxedo represents a middleware product or system that can operate as an extension of an operation system (for example, UNIX). As a platform for execution and development, Tuxedo is designed for the creation and administration of e-commerce online transaction processing (OLTP) systems.

In accordance with an embodiment, the Tuxedo system shown in FIG. 6 can include an Application-to-Transaction Monitor Interface (ATMI) environment for use in communications, transactions, and management of data buffers.

As shown in FIG. 6, the ATMI environment can include an external interface layer 611, an ATMI layer 613, a system services layer 615, and a resource manager layer 617. The external interface layer can provide a plurality of interfaces between users and the ATMI environment. The ATMI layer can represent an interface between applications and the ATMI environment. The system services layer can provide services and/or capabilities for developing and administering applications.

In accordance with an embodiment, the Tuxedo system can use a message-based communications system to distribute applications across various operating system platforms and databases.

As shown in FIG. 7, communication within the ATMI environment can be accomplished by transferring messages. The Tuxedo system can pass service request messages between ATMI clients and servers through operating system (OS) inter-process communications (IPC) message queues. System messages and data can be passed between OS-supported, memory-based queues of clients and servers in buffers.

In accordance with an embodiment, messages in the ATMI environment can be packaged in typed buffers, which can represent buffers that contain both message data and data identifying the types of message data being sent.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A method for providing runtime tracing for a web-based client accessing a transactional middleware platform using an extension interface, comprising:
    providing an extension interface to a transactional middleware platform executing on one or more microprocessors, wherein the extension interface includes an extension configured to transmit messages between a web-based client and one or more application services implemented in a procedural programming language in the transactional middleware platform;
    providing a trace generator that is invoked by a modified class called at runtime, and includes a plurality of operations that are used to create a trace filter specifying categories of trace points, based on a trace specification defined by the transactional middleware platform, and the plurality of operations used to generate trace records according to the trace filter; and
    modifying each of a plurality of classes in a class library in the extension interface with an object comprising code to create a plurality of modified classes in the extension interface, wherein the plurality of classes are used by the web-based client to communicate with the transactional middleware platform, and wherein the object in each modified class invokes the trace generator; and
    invoking, via one or more objects instantiated from the class library, the trace generator at runtime to generate trace records for a service call from the web-based client to a particular application service.

2. The method of claim 1, wherein the trace specification is defined by an environmental variable in a configuration file of the transactional middleware environment.

3. The method of claim 1, wherein the trace records include information for a path of the service call, from the time the web-based client starts the service call to the time the web-based client gets a response.

4. The method of claim 1, wherein the web-based client is one of a Java applet in a Java-enabled web browser, or a standalone Java application.

5. The method of claim 1, wherein the trace specification is a string with a particular syntax that defines a filter, a receiver, and a trigger, wherein the filter specifies categories of trace points to be examined or ignored, wherein the receiver represents an entity to which the trace records are written, and wherein the trigger defines an action to be performed after a trace record is emitted.

6. The method of claim 1, wherein the trace points can include one or more trace points for use in tracing application calls to a communication interface in the transactional middleware platform, and one or more trace points for use in tracing network activities.

7. The method of claim 1, wherein one or more trace records are associated with an execution context identifier to correlate events across a plurality of layers of the extension interface.

8. The method of claim 1, wherein the transactional middleware platform uses a message-based communications system to distribute applications across a plurality of different types of operating system platforms and databases.

9. The method of claim 1, wherein the transactional middleware platform includes an Application-to-Transaction Monitor Interface (ATMI) environment for transferring messages between one or more client programs and one or more server programs.

10. A system for runtime tracing for a web-based client accessing a transactional middleware platform, comprising:
    a computer including one or more microprocessors;
    a transactional middleware platform, executing on the computer, wherein the transactional middleware platform includes an extension interface with an extension server configured to transmit messages between a web-based client and one or more application services implemented in a procedural programming language in the transactional middleware platform;
    a trace generator that is invoked by a modified class called at runtime, and includes a plurality of operations that are used to create a trace filter specifying categories of trace points, based on a trace specification defined by the transactional middleware platform, and the plurality of operations used to generate trace records according to the trace filter; and
    a class library, in the extension interface, that includes a plurality of the modified classes for use by the web-based client to communicate with the transactional middleware platform, wherein each class is modified with an object comprising code that invokes the trace generator at runtime;
    wherein one or more of the objects instantiated from the class library operate to invoke the trace generator to generate trace records for a service call from the web-based client to a particular application service.

11. The system of claim 10, wherein the trace specification is defined by an environmental variable in a configuration file of the transactional middleware environment.

12. The system of claim 10, wherein the trace records include information for a path of the service call, from the time the web-based client starts the service call to the time the web-based client gets a response.

13. The system of claim 10, wherein the web-based client is one of a Java applet in a Java-enabled web browser, or a standalone Java application.

14. The system of claim 10, wherein the trace specification is a string with a particular syntax that defines a filter, a receiver, and a trigger, wherein the filter specifies categories of trace points to be examined or ignored, wherein the receiver represents an entity to which the trace records are written, and wherein the trigger defines an action to be performed after a trace record is emitted.

15. The system of claim 10, wherein the trace points can include one or more trace points for use in tracing application calls to a communication interface in the transactional middleware platform, and one or more trace points for use in tracing network activities.

16. The system of claim 10, wherein one or more trace records are associated with an execution context identifier to correlate events across a plurality of layers in the extension interface.

17. The system of claim 10, wherein the transactional middleware platform uses a message-based communications system to distribute applications across a plurality of different types of operating system platforms and databases.

18. The system of claim 10, wherein the transactional middleware platform includes an Application-to-Transaction Monitor Interface (ATMI) environment for transferring messages between one or more client programs and one or more server programs.

19. A non-transitory computer-readable storage medium storing a set of instructions for providing runtime tracing for a web-based client accessing a transactional middleware platform using an extension interface, said instructions, when executed by one or more processors, causing the one or more processors to perform steps comprising:

providing an extension interface to a transactional middleware platform executing on one or more microprocessors, wherein the extension interface includes an extension configured to transmit messages between a web-based client and one or more application services implemented in a procedural programming language in the transactional middleware platform;

providing a trace generator that is invoked by a modified class called at runtime, and includes a plurality of operations that are used to create a trace filter specifying categories of trace points, based on a trace specification defined by the transactional middleware platform, and the plurality of operations used to generate trace records according to the trace filter; and modifying each of a plurality of classes in a class library in the extension interface with an object comprising code to create a plurality of modified classes in the extension interface, wherein the plurality of classes are used by the web-based client to communicate with the transactional middleware platform, and wherein the object in each modified class invokes the trace generator; and invoking, via one or more objects instantiated from the class library, the trace generator at runtime to generate trace records for a service call from the web-based client to a particular application service.

20. The non-transitory computer-readable storage medium of claim 19, wherein the trace specification is defined by an environmental variable in a configuration file of the transactional middleware environment.

* * * * *

UNITED STATES PATENT AND TRADEMARK OFFICE
CERTIFICATE OF CORRECTION

PATENT NO. : 10,402,307 B2
APPLICATION NO. : 15/193934
DATED : September 3, 2019
INVENTOR(S) : Li et al.

Page 1 of 1

It is certified that error appears in the above-identified patent and that said Letters Patent is hereby corrected as shown below:

On the Title Page

On page 2, Column 2, under Other Publications, Line 22, delete "Damela" and insert -- Pamela --, therefor.

In the Specification

In Column 2, Line 32, after "purposes" insert -- . --.

In Column 3, Line 60, delete "VVTC)" and insert -- WTC) --, therefor.

In Column 4, Line 62, delete "270," and insert -- 207, --, therefor.

Signed and Sealed this
Twenty-fifth Day of August, 2020

Andrei Iancu
*Director of the United States Patent and Trademark Office*